United States Patent [19]

McCain

[11] Patent Number: 4,883,302
[45] Date of Patent: Nov. 28, 1989

[54] CAR TRUNK SECURITY DOOR

[76] Inventor: Andrew H. McCain, 170 N.E. 163rd St., N. Miami Beach, Fla. 33162

[21] Appl. No.: 168,240

[22] Filed: Mar. 15, 1988

[30] Foreign Application Priority Data

Mar. 3, 1987 [GB] United Kingdom ............... 8704976

[51] Int. Cl.⁴ .............................................. B60R 5/04
[52] U.S. Cl. ................................. 296/37.1; 224/42.42; 49/63
[58] Field of Search .................... 296/37.1; 224/42.42; 49/67, 63

[56] References Cited

U.S. PATENT DOCUMENTS

| | | | |
|---|---|---|---|
| 1,456,247 | 5/1923 | Miller | 224/42.42 |
| 1,792,798 | 2/1931 | Arnot | 296/37.1 X |
| 3,272,551 | 9/1966 | Walker | 296/37.1 |
| 4,724,986 | 2/1988 | Kahn | 224/42.42 |
| 4,728,017 | 3/1988 | Mullican | 224/42.42 |

FOREIGN PATENT DOCUMENTS

| | | | |
|---|---|---|---|
| 2701786 | 7/1978 | Fed. Rep. of Germany | 296/37.1 |
| 2933130 | 3/1981 | Fed. Rep. of Germany | 296/37.1 |
| 1302853 | 1/1973 | United Kingdom | 296/37.1 |
| 1451751 | 10/1976 | United Kingdom | 224/42.42 |

Primary Examiner—Dennis H. Pedder

[57] ABSTRACT

An anti-theft car trunk security door with frame being substantially two dimensional with a periphery of protractable rods at each end of the frame serve to suspend the frame between the trunk's side walls. The frame is constructed to be slightly larger than the trunks opening. The over hanging edge of the trunk opening serves to prevent extraction of the frame until all the suspension rods are completely retracted for clearance. Access to the rods is fascilitated only by removing the door which is lockable. The device can be secured at any height above the trunk's bottom floor. Locking side walls and a bottom floor of its own, the device is very light and doesn't obstruct access to the cars wiring or accessories which may be in the trunk's walls.

4 Claims, 1 Drawing Sheet

CAR TRUNK SECURITY DOOR

This invention relates to a demountable car trunk security door with frame.

Automobile trunk compartments are increasingly called upon to store valuables. The common trunk covering provided by the auto makers and the stock locks are no longer capable of withstanding the onslaught of well equipped criminals.

According to this invention a demountable car trunk security door with frame not having sidewalls or a bottom wall installed in the trunk under the existing covering provided by the car maker (trunk lid), would provide a hidden second door impervious to break-ins and provide a very secure compartment for storing valuables and car accessories.

A specific embodiment of the invention will now be described by way of example with reference to the accompanying drawing.

Figure 1:
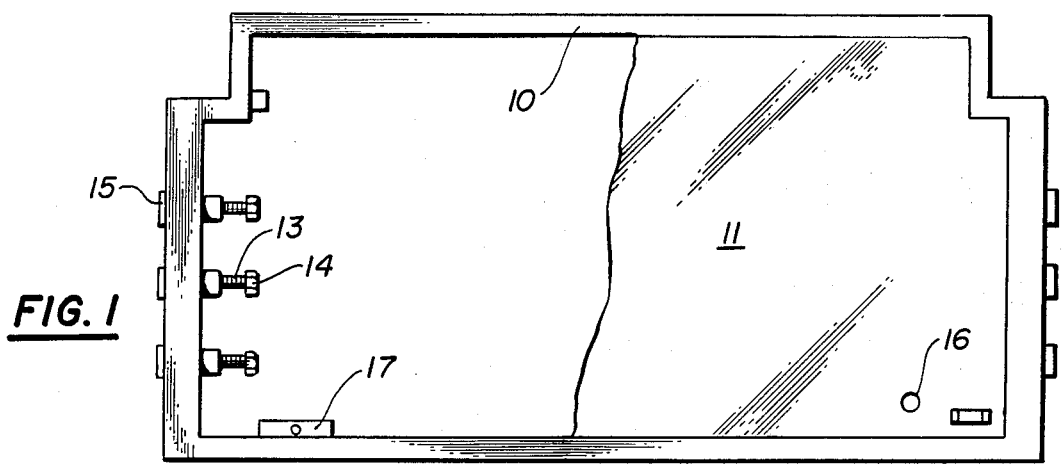
FIG. 1 illustrates the securing mechanisms, locks, and door-to-frame buttresses as seen viewed though the complete structure from overhead. (without trunk).
Figure 2:
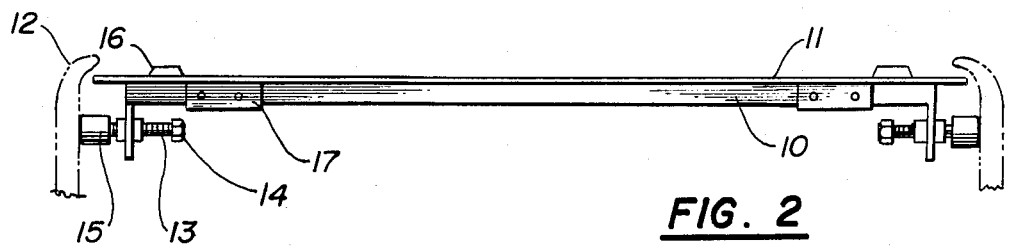
FIG. 2 shows the frame and its door fastened in place from the front side.
Figure 4:
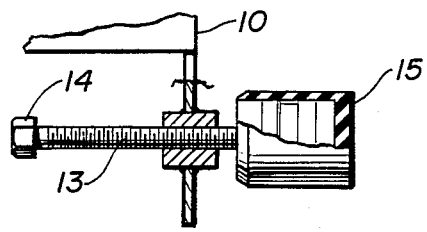
FIG. 4 shows an enlargement of one of several fastening means used to secure a frame to the sidewalls of a trunk.
Figure 3:
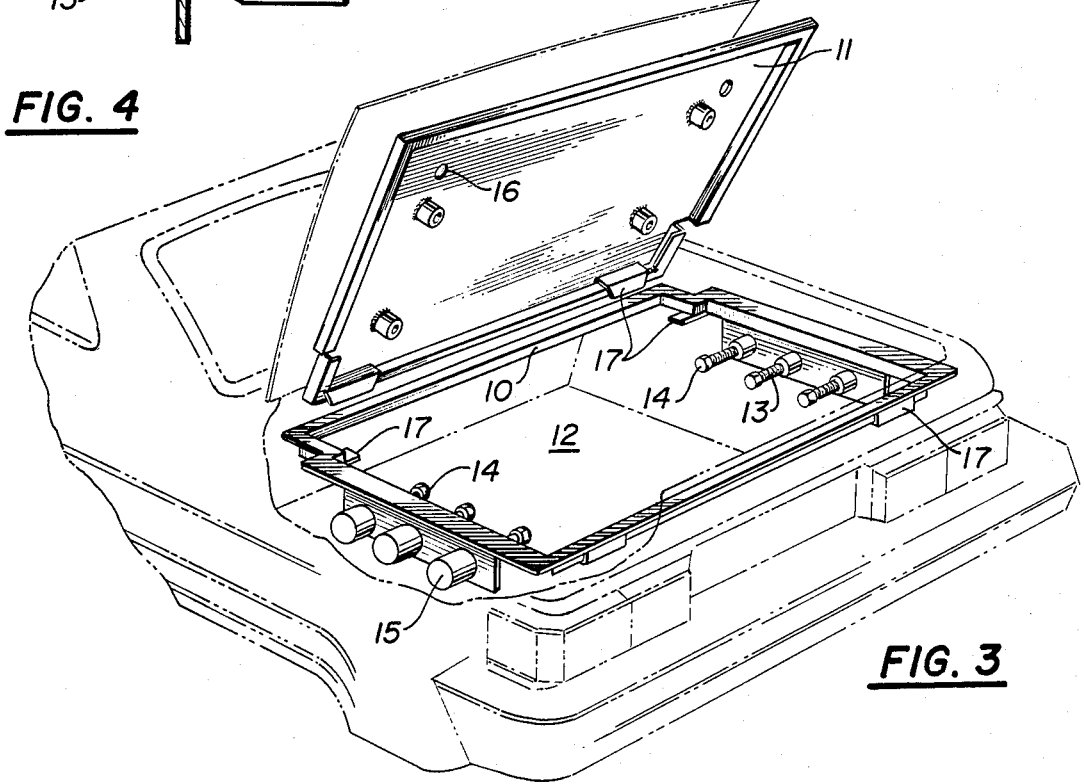
FIG. 3 shows the frame fastened in place with its door in a lifted out position.

The demountable security door of this invention comprises a frame 10 detachable from a security door 11. The latter is provided with buttreses 17 that are engageable with frame 10 and locks in holes 16. The locks secure door 11 to frame 10 when buttreses 17 engage frame 10. The latter has a plurality of frame fastening means, each comprising a threaded rod 13 having a hexagonal head 14 facing inward and a pivoting swivelling foot pad 15 at its outer end. Three fastening means are shown in the illustrative embodiment (although the number is not necessarily limiting to this invention) to engage each sidewall to the trunk 12.

Referring to the drawing the security doors frame 10 minus the door 11 is lowered at an angle into a car trunk 12. To do this it may be necessary to retract all rods 13 by turning their bolt heads 14 counter clockwise for clearance.

When frame 10 is in the boot and square with the boot walls, the rods 13 on one side may then begin to be screwed clockwise by using a tool. (not shown).

After some turning the rubber disc feet 15 at the ends of the rods 13 will begin to contact the inside wall of that side of the trunk 12. Now turning of the rods 13 on the other side will allow the frame 10 to suspend itself just up under the top edges of the trunk 12.

When the rods 13 have sufficiently tightened to hold frame 10 in place further even tightening of the rods 13 will firmly secure the frame 10. With the frame 10 installed it's a simple matter of slotting in the removable door and locking the locks (not part of this invention). The units can be made to fit any boot size.

When the door 11 is locked to frame 10, items stowed below the locked door 11 are secure from theft even when the original trunk lid is opened.

I claim:

1. A demountable security door system for a car trunk comprising a frame with an opening and longitudinal ends, said frame being substantially two dimensional and mountable within said car trunk with a trunk opening, bottom wall, and sidewalls at opposite lateral ends of said trunk, a door attachable to said frame and constructed and arranged with buttresses to cover said frame opening, frame fastening means comprising a plurality of rods of adjustable lengths extending longitudinally of said frame and rotatably secured to each end of said frame for adjusting the length of said rods, said frame spaced from said trunk's bottom wall with pivoting, swiveling foot pads fastened to the distal ends of each of said rods for self alignment of said pads against said sidewalls of said car trunk and to distribute outward stress caused by extending the rods against said side walls to hold said frame at any position of height securely within said trunk below a lid for said car trunk.

2. A security system as in claim 1, wherein said buttresses are adapted to fit into said frame to prevent extraction of said security door from said frame.

3. A security system as in claim 2, further including holes in said door adapted to receive lock means to secure said security door to said frame.

4. A security system as in claim 1, wherein said frame is constructed slightly larger than said opening of said trunk.

* * * * *

UNITED STATES PATENT AND TRADEMARK OFFICE
CERTIFICATE OF CORRECTION

PATENT NO. : 4,883,302

DATED : November 28, 1989

INVENTOR(S) : Andrew H. McCain

It is certified that error appears in the above-identified patent and that said Letters Patent is hereby corrected as shown below:

On the title page:
   In Line Eleven of the Abstract the word Locking is incorrect and should read Lacking.

Signed and Sealed this

Seventh Day of April, 1992

Attest:

HARRY F. MANBECK, JR.

Attesting Officer

Commissioner of Patents and Trademarks